July 19, 1932.   F. W. HALL ET AL   1,867,566
TREATING HYDROCARBON OILS
Filed July 9, 1928
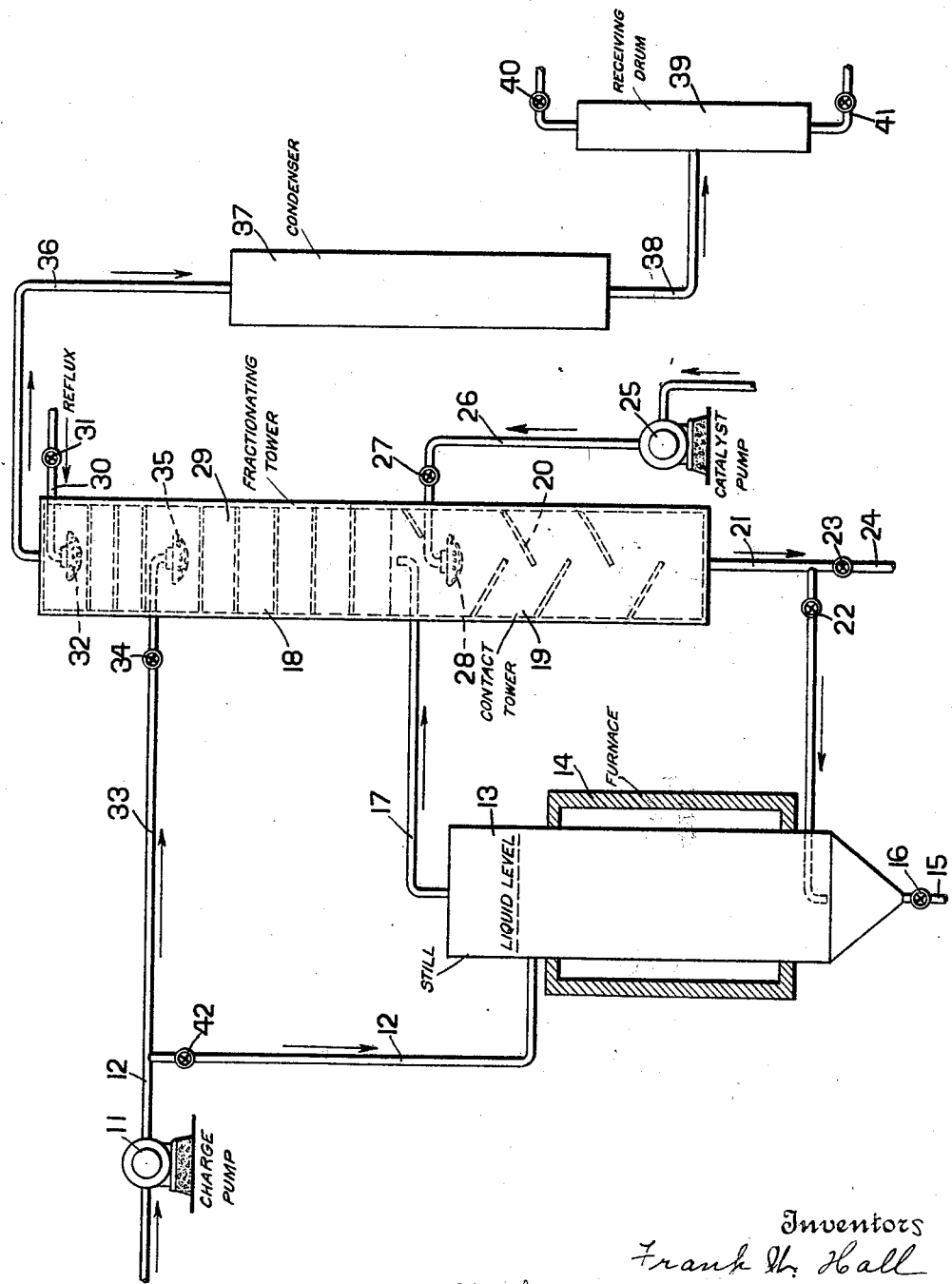
Inventors
Frank W. Hall
By their Attorney Vance N. Jenkins
R. J. Dearborn Patented July 19, 1932

1,867,566

UNITED STATES PATENT OFFICE

FRANK W. HALL, OF PORT ARTHUR, TEXAS, AND VANCE N. JENKINS, OF ELIZABETH, NEW JERSEY, ASSIGNORS TO THE TEXAS COMPANY, OF NEW YORK, N. Y., A CORPORATION OF DELAWARE

TREATING HYDROCARBON OILS

Application filed July 9, 1928. Serial No. 291,202.

This invention relates to treating hydrocarbon oils and more particularly to the conversion of higher boiling hydrocarbon oil into lower boiling oils through the action of an aluminum chlorid catalyst at elevated temperatures.

Broadly, the invention comprises a process wherein a body of oil is maintained under conditions of distillation, the vapors evolved therefrom condensed to form a hot condensate and contacted with an aluminum chlorid catalyst whereby a portion thereof is converted into lower boiling oil passing off as vapor, the unconverted portion of the oil being returned to the still. The conversion may be carried on at atmospheric pressure or under superatmospheric pressure.

In one form of the invention the higher boiling oil to undergo conversion may be charged directly in contact with the oil vapors evolved from the body of oil undergoing distillation, whereby the vapors are condensed and the oil charge heated to form a hot mixture of oil charge and condensate which is thereafter caused to undergo conversion by contact with an aluminum chlorid catalyst.

An important feature of the invention is the method of contacting the aluminum chlorid catalyst and heated oil without bringing the catalyst into contact with the externally heated surfaces of the apparatus. The method has the added advantage that relatively non-volatile, tarry products of the conversion reaction do not come in contact with the fresh or active catalyst, thereby promoting longer life and greater efficiency in the catalyst.

The invention may be readily understood from a description of the procedure of the process considered in connection with the accompanying drawing which represents a somewhat diagrammatic sectional elevation of apparatus within the invention and suitable for use in carrying on the conversion process.

Referring to the drawing, there is provided a charging pump 11 for the purpose of forcing the oil charge from a suitable source (not shown) through the charging line 12 to the still 13. The still 13, which may be of the vertical type, as shown, is provided with suitable heating means such as the surrounding furnace 14. Electrical or other suitable heating means may be provided if desired. A draw-off connection 15, fitted with the valve 16, is provided at the lower end of the still, while a vapor line 17 leads from the vapor space in the upper portion of the still to the tower 18.

The tower 18 is divided into two sections, the lower or contact section 19 being provided with suitable baffles 20 and at its lower end a line 21 leading to the lower portion of the still 13, preferably below the heated portion of the still. The line 21 is fitted with valves 22 and 23 and a branch line 24, as shown.

A suitable source of catalyst material (not shown) is connected to the catalyst pump 25, which is in turn connected through the line 26, fitted with the valve 27, to the distributer 28, placed in the upper portion of the contact section 19 of the tower 18.

The upper or fractionating portion 29 of the tower 18 may be of any suitable construction such for example as a packed tower, or of the type known as a bubble tower. A connection 30 is provided at the upper end of the tower 29 and is fitted with a valve 31 and a distributer 32 within the tower whereby liquid reflux material may be introduced directly into the upper portion of the tower. Other suitable means for cooling the upper portion of the tower may be provided. A line 33, a branch of the charging line 12, also enters the tower 29 at its upper end, being fitted with the valve 34 and distributer 35 whereby the charge, if desired, may be introduced directly into the tower 29. A valve 42 is provided in the charging line 12 whereby the direction of flow of the charge may be regulated.

From the upper portion of the tower 29 a vapor line 36 leads to a suitable condenser 37 from which a condensate line 38 leads to the receiving drum 39, fitted with suitable connections 40 and 41 for the withdrawal of fixed gas and distillate, respectively.

The process comprising the invention may be carried on in connection with the apparatus shown as follows:

A suitable oil for conversion, which will be referred to as the charging stock and which may be a kerosene or gas oil fraction of petroleum or other suitable material, is forced by means of the charging pump 11 through the charging line 12 to the still 13, the valve 42 being open while the valve 34 is closed. If desired, the oil charge may be heated by suitable means (not shown) before introduction into the still. The still 13 is heated by means of the furnace 14 to a temperature suitable for vaporizing the oil charge. The temperature of the contents of the still will vary somewhat depending upon the pressure maintained and also upon the characteristics of the oil charge, but in the case of a light gas oil charge and operations under normal atmospheric pressure, the temperature in the still may be substantially 540° F.

The charge is vaporized and distilled from the still 13 through the vapor line 17 into the tower 18 at a point approximately at the dividing line between the contact section 19 and the fractionating section 29 of the tower. The oil vapors then pass upward through the fractionating section 29 but are cooled by means of the liquid reflux material entering the tower through the line 30 and distributed therein through the distributer 32. Accordingly the vapors of the charge oil are condensed, running back into the contact section 19 of the tower 18.

In the contact section 19 the aluminum chlorid catalyst, preferably in the form of liquid aluminum chloridhydrocarbon compound, is introduced through the line 26 into the distributer 28 by means of the catalyst pump 25. The liquid catalyst and the hot condensate from the fractionating section 29 of the tower 18, flow downward through the contact section 19 of the tower over the baffles 20 thereby coming in intimate contact and, being at elevated temperatures which may be in the neighborhood of 500° F. or more, the conversion reaction takes place in this section of the tower.

As the conversion reaction takes place the lighter products of the reaction are vaporized and pass upward through the fractionating section 29, being subjected therein to fractional distillation whereby they are separated from the heavier products of the reaction and the less volatile charging oil. The degree of fractionation obtained and the boiling range of the distillate may be varied by varying the amount of reflux material admitted to the tower through the connection at 30, by means of the manipulation of the valve 31. Preferably, the operation is so carried on that the vapors leaving the tower 29 through the vapor line 36 to the condenser 37 may be of a boiling range substantially equal to that of ordinary gasoline. The condensable portion of the vapors is condensed in the condenser 37 and, together with non-condensable gases, passes through the line 38 to the receiving drum 39 where the condensate may be withdrawn through the connection at 41, while fixed gases may be withdrawn through the connection at 40.

In the lower portion of the contact section 19, the heavier and less volatile portion of the converted oil collects, together with the unconverted oil and the spent catalyst. This mixture flows from the contact section 19 through the line 21 and may be withdrawn through the connection at 24 by means of the valve 23, but preferably, the valve 23 is maintained closed while the valve 22 is opened and the mixture of spent catalyst, unconverted charging stock, and the heavier products of the conversion reaction, flow to the lower portion of the still 13, the mixture preferably entering the still at a point below that at which heat is applied. In the still the spent catalyst tends to settle to the bottom as do also the heaviest of the products of conversion, while the unconverted oil is again vaporized and, passing through the vapor line 17, is again subjected to the action of the catalyst. The material settling to the bottom of the still 13 may be withdrawn continuously or periodically through the connection at 15 by means of the valve 16.

In a modified method of operation, the valve 42 may be closed and the valve 34 opened whereby the oil charge is forced by means of the pump 11 through the line 33 into the fractionating section 29 of the tower 18, being distributed therein by means of the distributer 35. By this means the cool charge meets the ascending vapors from the still 13 and is heated thereby, thereafter passing through the contact section 19 of the tower 18 wherein it comes in contact with the catalyst and is subjected to the action of the catalyst. If desired, varying portions of the charge may be thus introduced into the tower, the remaining portion being introduced into the still through the line 12, as first described. In such operation, the cool charge may serve to supply a portion or all of the reflux cooling applied to the tower and the quantity of cooling supplied through the connection 30 may be modified accordingly. A particular advantage of the method of operation in which the oil is introduced into the fractionating section 29 is that by this means the charge thus introduced is thoroughly dehydrated before it is possible for it to come in contact with the aluminum chlorid catalyst, the activity of which is completely destroyed by moisture.

The process may be carried on under superatmospheric pressure if desired. For example, in the conversion of a comparatively low boiling oil which may be of the nature of a light kerosene distillate, to form a material boiling within the ordinary gasoline range, it may be found that the temperature of the oil in the contact section 19 will not be high enough to cause the conversion reaction to take place readily in the presence of the catalyst. Under such conditions a superatmospheric pressure may be maintained upon the entire apparatus whereby the oil in the still 13 will boil at a higher temperature. By such means the temperature of the hot condensate flowing into the contact section 19 from the fractionating section 29 will be materially increased thereby increasing the speed of the conversion reaction as desired.

Obviously many modifications and variations of the invention, as hereinbefore set forth, may be made without departing from the spirit and scope thereof, and therefore, only such limitations should be imposed as are indicated in the appended claims.

We claim:

1. The process of converting higher boiling hydrocarbon oil into lower boiling oil which comprises maintaining a body of oil under conditions of distillation, passing evolved vapors into a fractionating tower, continuously introducing fresh oil into the tower whereby a portion or all of the vapors are condensed and the fresh oil heated, contacting said condensate and fresh oil with an aluminum chlorid catalyst while maintained at a conversion temperature, separate from said body of oil undergoing distillation and not in direct contact with said vapors evolved from said body of oil, whereby a portion of the condensate is converted into lower boiling oil, passing vapors of said lower boiling oil through said fractionating tower and returning the unconverted portion of the oil to the said body of oil undergoing distillation.

2. The process of converting higher boiling hydrocarbon oil into lower boiling oil which comprises maintaining a body of oil under conditions of distillation; passing evolved vapors into a fractionating tower, continuously introducing fresh oil into the fractionating tower whereby a portion or all of the vapors are condensed and the fresh oil heated, passing the mixture of condensate and fresh oil through a contact zone together with an aluminum chlorid catalyst while maintained at a conversion temperature, separate from said body of oil undergoing distillation and not in direct contact with said vapors evolved from said body of oil, whereby a portion of the condensate is converted into lower boiling oil, passing vapors of said lower boiling oil through the fractionating tower and separating the spent catalyst from the unconverted oil.

In witness whereof I have hereunto set my hand this 22nd day of June, 1928.

FRANK W. HALL.

In witness whereof I have hereunto set my hand this 2nd day of July, 1928.

VANCE N. JENKINS.